Feb. 24, 1953        R. R. HULL        2,629,236
REFRIGERATED BEVERAGE DISPENSER Filed May 19, 1949        5 Sheets-Sheet 1

FIG. 1

INVENTOR.
ROBERT R. HULL
BY
ATTORNEY

Feb. 24, 1953  R. R. HULL  2,629,236
REFRIGERATED BEVERAGE DISPENSER
Filed May 19, 1949  5 Sheets-Sheet 2

INVENTOR.
ROBERT R. HULL
BY
ATTORNEY

Feb. 24, 1953 R. R. HULL 2,629,236
REFRIGERATED BEVERAGE DISPENSER
Filed May 19, 1949 5 Sheets-Sheet 3

INVENTOR.
ROBERT R. HULL
BY
Robert E. Harris
ATTORNEY

Feb. 24, 1953    R. R. HULL    2,629,236
REFRIGERATED BEVERAGE DISPENSER
Filed May 19, 1949    5 Sheets-Sheet 5

INVENTOR.
ROBERT R. HULL
BY
ATTORNEY

Patented Feb. 24, 1953

2,629,236

UNITED STATES PATENT OFFICE 2,629,236

REFRIGERATED BEVERAGE DISPENSER

Robert R. Hull, Pasadena, Calif., assignor to Sunkist Growers, Inc., a corporation of California Application May 19, 1949, Serial No. 94,171

5 Claims. (Cl. 62—141)

My present invention relates to a sanitary beverage dispenser of the mechanically refrigerated type, pleasing in appearance and capable of rapidly reducing the temperature of a beverage to a desired level and of maintaining it at that temperature level while continuously gently agitating the beverage.

My invention possesses those outstanding, yet always difficultly attainable, attributes of utmost simplicity of construction and ease of operation. It comprises a refrigerated storage and dispensing container in which the container is formed with plain, simple surfaces, preferably transparent for display purposes, is completely and instantly removable for cleaning or exchange without disengaging any fastenings, has no auxiliary openings, connections, or gadgets to permit provision of agitation or thermostatic control, and yet is provided with an efficient agitator within the container and with a sensitive and effective thermostatic control.

My machine embodies a beverage container supported in contact with a cold plate for the purpose of refrigerating the beverage, an outer shell spaced from and surrounding the beverage container to provide an insulating air space, an agitator for the beverage, and drive mechanism therefor. The drive mechanism includes a relatively stiff flexible link connecting a rotating crank to an oscillating crank and a safety clutch through which the oscillating crank drives the agitator. A temperature control bulb is mounted on the cold plate in contact with the beverage container and insulated from the cold plate in order to effectively control the beverage temperature within relatively close limits. All of the foregoing mechanism is neatly and compactly arranged and completely housed so that the mechanism may not be tampered with unless the machine is partly disassembled.

It is known that many beverages are more palatable when served cold and that some beverages retain their palatability as well as other desirable and important characteristics for a longer period of time when maintained at a relatively low temperature. This is particularly true of citrus juices such as fresh orange juice, for example.

In order to cool a beverage and keep it cool, it is important to facilitate heat transfer from the beverage to the cold plate of the refrigerating unit on which the beverage container is supported. To accomplish this satisfactorily, and to assure efficient and sensitive operation of the temperature control unit, it is desirable to keep the beverage constantly in motion. This is accomplished in my device by means of a continuously operated, oscillating agitator which also serves to maintain insoluble solids uniformly distributed throughout the beverage. Such solids are present in fresh orange juice, for example, which contains a pulpy material mostly in the form of ruptured juice cells or sacs. These cells or sacs impart a desirable characteristic flavor to the juice, but, unless a gentle agitation or stirring action is constantly maintained, they will either settle to the bottom or float to the top of the beverage, resulting in a lack of uniformity of solids in the individual portions of beverage dispensed from time to time. Unless adequate agitation is provided, ice is likely to be formed on the inside of the container. The formation of such ice may prevent the control from functioning properly in response to variations in beverage temperature.

Figure 4:
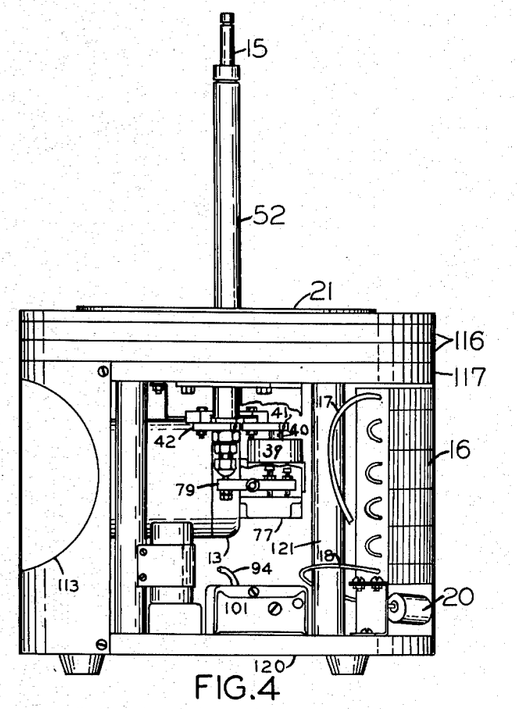
Figure 4 is a rear elevation of my dispenser, the base casing being in section and the outer shell, beverage container, and part of the support bracket being omitted to better show certain details of construction.
Figure 5:
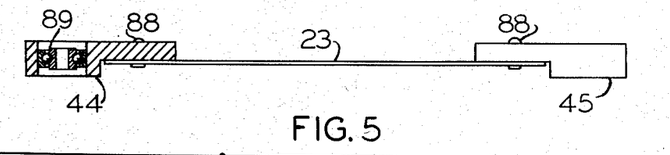
Figure 5 is a side view, partly in section, of my relatively stiff flexible connecting link.

My dispenser comprises a base 10 having a superstructure 11 supported thereon. As shown in Fig. 4, and more particularly in Fig. 7, the base houses a compressor unit 12 containing a built-in motor and a compressor driven thereby, a motor 13 for driving fan 14 and agitator shaft 15, a refrigerant condenser 16, and other control elements and mechanisms associated with the motors and the refrigerating system. A cold plate 21 made of stainless steel or other suitable material forms a top for the base.

Figure 1:
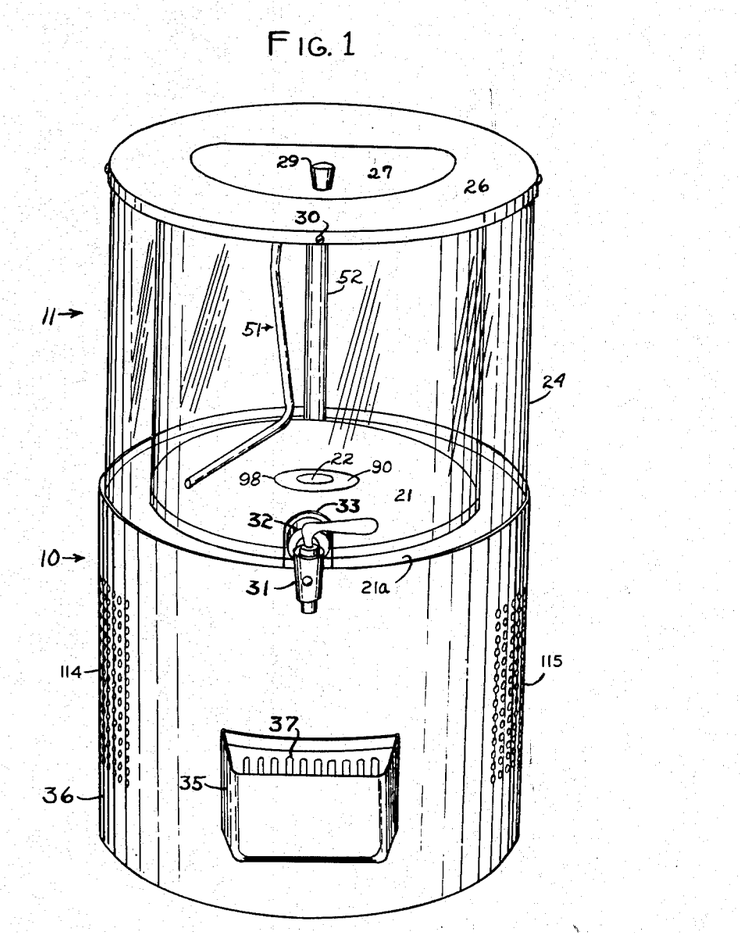
Figure 1 is a perspective view of my dispenser showing the general arrangement and outward appearance thereof.
Figure 2:
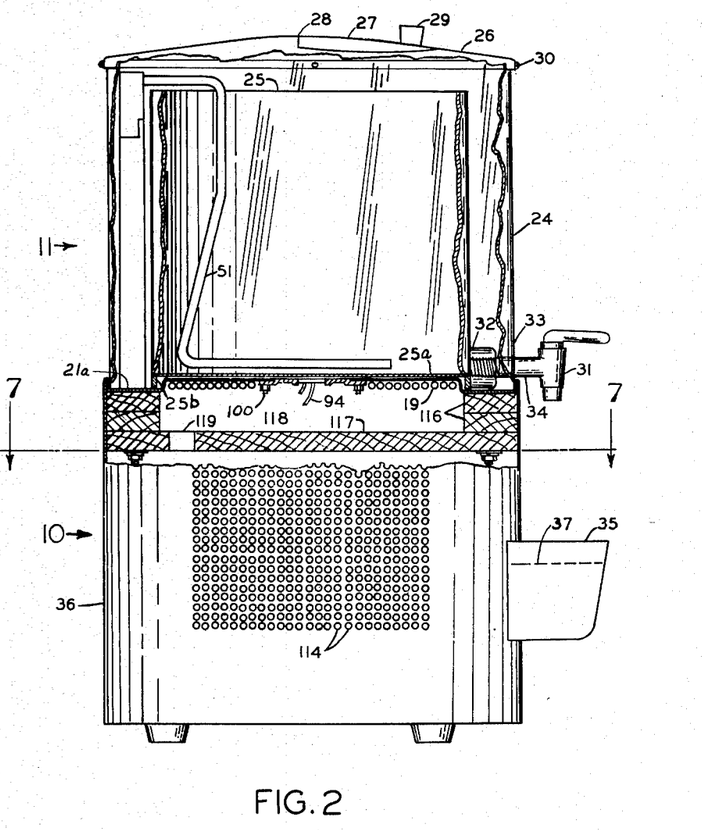
Figure 2 is a side view of my dispenser, partly in section to better show some of the structural details.

The superstructure, as shown in Figs. 1 and 2, includes a beverage container 25 and outer shell 24 having a cover 26. I prefer to make the container and shell of transparent material such as a transparent plastic but other transparent, translucent, or opaque material may be used if desired.

The perimeter of the cold plate 21 is provided with a depressed portion or trough 21a which receives the lower portion of outer shell 24 and also the lower portion 25b of beverage container 25. The trough cooperates with the shell and the container to facilitate their accurate placement in a centered, concentric position and prevents lateral displacement from this position. The trough also serves to retain any moisture that may be present due to condensation, for example. A cover 26 is provided for the outer shell 24 and may be secured thereto by means of suitable bolts 30. A small door 27 is hinged to the cover at 28 and may be provided with a knob 29.

An internally threaded boss 32 is secured to the beverage container 25 adjacent the bottom thereof for the reception of spigot 31. Outer shell 24 is provided with a cutaway portion 33 through which the stem of spigot 31 extends. This cutaway portion permits removal of the outer shell by merely lifting the same out of the trough 21a.

The bottom 25a of the container 25 is preferably made much thinner than the container walls. This relatively thin bottom will conform to any slight irregularities of the surface of the cold plate 21 so that a relatively complete contact is had between these elements to facilitate the flow of heat from the beverage in the container to the cold plate. The thin bottom will, in addition, have considerably less resistance to the flow of heat than would a thicker bottom. A side wall extension 25b is secured to the bottom of the container. This may take the form of a ring cemented or otherwise secured to the container bottom at its outer periphery. One of the functions of this ring is to cooperate with the cold plate trough 21a to locate and maintain the container in its proper position with respect to the cold plate. Another important function of this ring is to reduce the possibility of condensate or accidentally spilled beverage entering the space between the container bottom and the cold plate. Still another function is to maintain the container bottom 25a out of contact with any flat supporting surface upon which the container may be placed when removed from the machine. This prevents the container bottom from becoming scratched and from picking up dirt or other foreign material when removed temporarily from the machine. Such dirt or other matter would, unless removed, prevent a good heat conducting contact between the container bottom and the cold plate and would greatly impair the efficiency of the cooling mechanism.

A base casing 36 of stainless steel or other suitable material surrounds the base and encloses the mechanism located therein. Drip trough 35 is detachably secured to the casing 36 below the spigot 31 and is provided with a removable grating 37 on which a cup or other receptacle may be placed, in beverage receiving position, during the dispensing operation. Drip trough 35 may be readily detached from casing 36; and grating 37 may be removed from the trough for the purpose of cleaning these elements.

Figure 7:
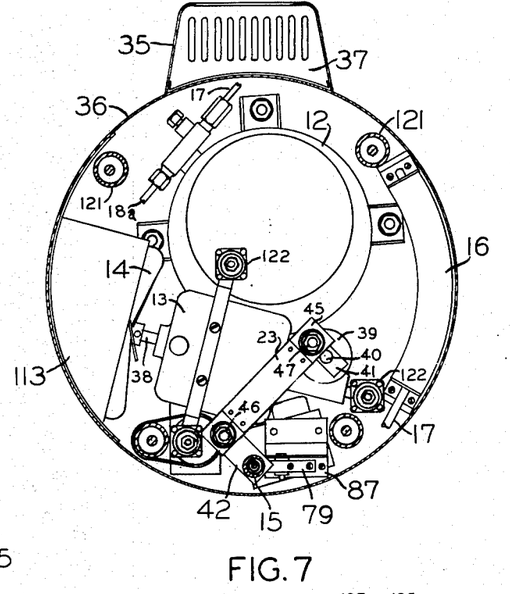
Figure 7 is a sectional view of the base of my dispenser taken on line 7—7 of Figure 2.

The refrigerant, which may be Freon No. 12 (dichlorodifluoromethane) or other suitable material, normally flows as gas from the high pressure side of the compressor unit 12, Fig. 7, through tubing 17 to the condenser 16 from which it flows as liquid through tubing 18 preferably to the center of refrigerating coil 19, Fig. 2, which in turn discharges through tubing 18a to the low pressure side of the compressor unit. The condenser is curved, as shown in Fig. 7, in order to facilitate a compact arrangement of the various components in the base. The condenser may be made in various ways but I have found it expedient to make it flat and then bend it to the desired curvature. I prefer to deliver the liquid refrigerant to the center of the coil 19 so that it will flow outwardly to the periphery. This arrangement makes it possible to so design the refrigerating mechanism and to adjust the refrigerant charge as to maintain the outer area of the periphery of the cold plate which is not covered by the beverage container relatively warm and thus minimize or prevent the formation of frost or condensate on this area. Frosting of the outer periphery of the cold plate covered by the container bottom is also prevented or reduced, thus preventing or reducing the sticking of the container to the cold plate due to frost. A dehydrating element 20, Fig. 4, is interposed in line 18 to remove any trace of water that may be present in the refrigerant.

Refrigerating coil 19 is soldered or otherwise secured to cold plate 21 in any suitable manner that will facilitate the exchange of heat between these elements. This coil preferably covers a substantial area of the cold plate, leaving a free portion in which a thermostat control bulb 22 and its heat insulating ring 90 are positioned. As shown, the refrigerating element or coil 19 is annular in arrangement for convenience of manufacture, and the free portion is at the center. While I have shown and prefer to use a coil as the refrigerating element, this element may be formed in other shapes or forms if desired. My cold plate is shown as circular in the drawings but it may be rectangular or of any other shape desired. It is preferable in all cases, however, to supply the refrigerant to the element in such a manner that the flow will be outwardly toward the periphery of the cold plate for the reasons set forth above.

I now wish to call attention in detail to a further important aspect of my invention.

In use, dispensers of the type disclosed may sometimes be filled with beverage at a temperature higher than the temperature at which the beverage is to be maintained in the dispenser. The temperature of this beverage may in some instances equal or exceed normal room temperature, whereas it may be desirable to dispense the beverage at a lower temperature. In the case of orange juice, for example, a highly desirable temperature at which to maintain the juice in the dispenser is from 32° F. to about 34° F. It is, therefore, desirable to use the full capacity of the refrigerating mechanism by running it continuously from the time the beverage at relatively high temperature is placed therein until it is reduced to the temperature where it is to be maintained within relatively close limits.

If the control bulb of a conventional bellows type temperature control unit is placed in the beverage container, operation of the refrigerating mechanism controlled by that unit will be dependent upon the temperature of the beverage. If the beverage is constantly agitated, operation will be satisfactory without ice formation provided the control is properly adjusted. Such an arrangement, however, introduces sanitary and mechanical difficulties that have, insofar as applicant is aware, ruled out the use of this control arrangement in applications where sanitary conditions must be maintained. Maintenance of sanitary conditions is, of course, a prime requisite in a device of this general class. In a dispenser of the type herein disclosed the container must therefore be removed frequently for cleaning and sterilizing. This would involve lifting the control bulb out of the container, during which operation the capillary tube connecting it to the bellows would be flexed and subject to breakage. The control bulb and capillary tube could not readily be cleaned or sterilized. For this reason they would not meet the health requirements of most localities. There is also a possibility of leakage of the gas from the bulb or capillary tube into the beverage and this possibility is even more likely where an agitator is employed, inasmuch as it might rupture the bulb or capillary tube if it should come in contact therewith. It will be seen, therefore, that it is desirable to locate the control bulb at some point other than within the beverage container.

The bulb could be located directly in contact with the cold plate or with its refrigerating coil. When so located it would have to be so adjusted as to stop the refrigerating mechanism before the cold plate reached a temperature low enough to result in the formation of ice in the beverage whenever the temperature of the beverage should approach its freezing point. Otherwise, ice would always be expected to form eventually. This control could, therefore, only be set at a temperature slightly below the freezing point of the beverage and it would have to be set to cut off the refrigerating mechanism at this temperature. With such a control, the refrigerating mechanism would start to run when beverage at room temperature, or at any temperature substantially higher than that for which the control was set, was placed in the container, but it would not continue to run until the whole body of the beverage was reduced to the control point, say, approximately 32° F. It would run only until the refrigerating coil or cold plate, not the beverage, was reduced to that temperature. It is manifest, therefore, that the operation of the refrigerating mechanism would be initially cut off before the beverage was reduced to the desired temperature. The beverage, after the first cut off of the refrigerating mechanism, would still be relatively warm and would therefore rather quickly rewarm the control bulb, thus causing the refrigerating mechanism to start to run again. The above cycle would then be repeated. Moreover, it would continue to be repeated, and at increasing frequency as the beverage temperature decreased, since less time would be required in each instance to cool the control bulb back down to the temperature control point. It would take a relatively long time, therefore, to reduce the beverage itself to the desired temperature. In other words, with the control bulb so located, the refrigerating mechanism would not, and could not, be utilized to remove heat from the beverage at a rate corresponding to the maximum capacity of the refrigerating mechanism. It is even possible, when the control bulb is located directly in contact with the cold plate or with the refrigerating coil, for the beverage actually to get warmer rather than cooler, even though the refrigerating mechanism is cycling on and off, if the beverage is initially at a temperature below that of the surrounding atmosphere. Under such conditions, the warming of the beverage due to the ambient temperature is at a rate greater than the rate of heat removal from the beverage by the refrigerating mechanism operating on short cycles. For the foregoing reasons, location of the control bulb directly in contact with the cold plate or the refrigerating coil does not result in operation of the refrigerating mechanism in direct response to the beverage temperature, but rather in response to the temperature of the refrigerating coil or cold plate. With such a control arrangement, the full capacity of the refrigerating mechanism cannot be utilized to quickly reduce the beverage temperature to the desired dispensing temperature.

Obviously, however, great advantages are to be achieved in ease and low cost of manufacture, in convenience in installing and removing the beverage container, and in cleansing and caring for both the beverage container itself and for the rest of the machine, if, while at the same time achieving both effective temperature control within the beverage and maximum effective utilization of the capacity of the refrigerating mechanism, it is possible simply to set the container upon the cold plate to install it and to pick it up again to remove it, with no connection or fastening to be inserted or removed or to be adjusted.

Figure 3:
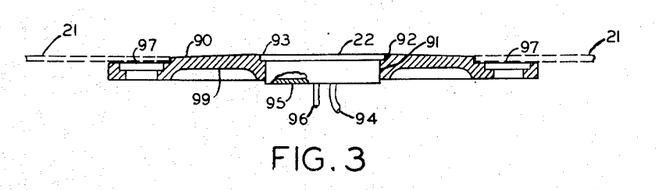
Figure 3 is a partial sectional view of my temperature control bulb and its associated heat insulating ring, part of the cold plate being shown in dotted lines.

I have succeeded both in overcoming the difficulties explained above and in achieving the above stated highly desirable results, all of which I accomplish by mounting my temperature control bulb 22 integrally with the cold plate 21 and within the area of the surface thereof and at the same time surrounding the control element 22 with heat insulating ring 90. This assemblage is shown in detail in Fig. 3. This insulating ring is preferably made of material that is impervious to moisture, a poor heat conductor, and readily machinable or capable of being otherwise readily fabricated. I have found in practice that paper base phenolic laminated fibre is a suitable material and this is the one I prefer to use. The insulating ring is preferably circular as shown in Figure 1 and is provided with a central opening 91, counterbored at 92 to receive the control bulb 22. The control bulb may be made of stainless steel or other suitable material and is provided with a rim 93 which is received in the counterbore 92. Capillary tube 94 is soldered or otherwise secured to plate 95, which in turn is soldered or otherwise secured to the control bulb to form a bottom therefor. The capillary tube communicates with the interior of the control bulb. Tube 96 is also secured to the plate 95 and provides access to the control bulb system for charging with any suitable gas, such as methyl chloride, for example. After charging, tube 96 is pinched off and is soldered or otherwise sealed to close the system. Suitable openings 97 are provided for the purpose of receiving bolts 100 which are welded or otherwise secured to the bottom of the cold plate and which serve to secure ring 90 and its associated control bulb 22 in centrally located opening 98 in the cold plate. A suitable cement is also applied to the cold plate, bulb, and ring joints to prevent the entry of moisture. In order to further insulate the control bulb from the cold plate and to restrict the flow of heat therefrom to the cold plate, I reduce the cross sectional area of the ring 90 by forming an annular groove 99 therein, concentric with and surrounding the opening 91. Capillary tube 94 communicates with the bellows of a control element 101, Fig. 4. Any high quality control having a narrow range of response may be used. The control includes a switch operated by the bellows in response to variations in pressure in the system resulting from variations in temperature of the control bulb and the gas contained therein. I connect this switch in my compressor motor circuit so that operation of the compressor is governed by the control.

It will, upon due consideration, be apparent that by the above construction and arrangement of elements, I have provided a system in which, during normal operation, the flow of heat will always be from the beverage to the cold plate, inasmuch as the cold plate temperature will be less than the beverage temperature. Assuming uniform resistance to heat flow over the bottom area of the container, the greatest flow of heat will take place at the points or areas of greatest temperature differential. This area of greatest temperature differential will be the annular area directly over the refrigerating coil. Heat flowing from the beverage to the control bulb will, of course, tend to increase the temperature of the bulb to a temperature approximating, but still somewhat below, the beverage temperature. In view of the fact that the control bulb is insulated, as by means of ring 90, from the cold plate, there will be a minimum of heat flow through this ring from the control bulb to the cold plate; and the temperature of the control bulb will consequently vary substantially as the temperature of the beverage rather than as the temperature of the cold plate.

With this arrangement and in a commercial machine constructed in accordance with the instant disclosure, it has been shown to be possible for the cold plate to reach temperatures in the neighborhood of −20° F., or below but, inasmuch as the control bulb is responsive to beverage temperature, the refrigerating mechanism will continue to operate until the beverage temperature reaches the desired point, at which time the control bulb will have become cold enough to function to operate the control mechanism and to shut off the refrigerating mechanism. It will be seen, therefore, that when relatively warm beverage is placed in the container a large temperature differential may be established and maintained between it and the cold plate, thus effecting a rapid reduction in the beverage temperature. Such a temperature differential could not be established or maintained if the control bulb were secured to the cold plate or to the refrigerating coil and directly controlled by the temperature thereof, as pointed out heretofore.

It has been pointed out heretofore that the container bottom 25a is relatively thin and flexible so that it may conform to minor irregularities in the surface of the cold plate. In order to assure a good heat conducting contact between the control bulb 22 and the container bottom, I prefer to crown the control bulb and insulating ring slightly so that the center of the control bulb is several thousandths of an inch higher than the general plane of the cold plate surface.

As shown generally in Fig. 4, but more in detail in Fig. 7, shaft 38 extends from one end of motor 13 and drives a fan 14 secured thereto. The other end of the motor is provided with a reduction gear 39 which may be integral with the end bell of the motor. This has a vertical shaft 40 extending therefrom and rotating at a speed slower than that of motor 13. Crank 41 is secured to and supported by the end of shaft 40 and is coupled, by means of a connecting link 23, to a crank 42, having a greater throw than crank 41, mounted on the lower end of agitator shaft 15. The link 23 is made of nonstretchable, noncompressible, flexible material such as relatively thin spring steel of sufficient stiffness and rigidity to transmit the desired thrust but sufficiently flexible to bend or flex somewhat to compensate for any misalignment of shafts 15 and 40 and to reduce the transmission of vibrations. The term "relatively stiff flexible" as used hereinafter refers to material having the foregoing characteristics. This link construction also makes it possible to resiliently mount the motor 13 and greatly reduces the transmission of vibration from this motor to other parts of the machine, thus reducing noise. It also greatly facilitates manufacture and assembly of the device, inasmuch as it eliminates the necessity of maintaining close alignment tolerances of the shafts 15 and 40 and the cranks or other elements associated therewith as would be required with a rigid, nonflexible link. The link 23 is riveted, as by means of rivets 88, or otherwise secured to blocks 44 and 45 at its respective ends. These blocks are, conveniently, L shaped and house bearings 89 preferably of the sealed and lifetime lubricated ball type, which receive the pintles 46 and 47 on the cranks 41 and 42 respectively. The bearings are a press fit in bores formed in the blocks and are further retained in place by deforming the edges of these bores. Inasmuch as crank 41 has a shorter throw than crank 42, rotation of the former will result in oscillation of the latter through link 23.

Figure 6:
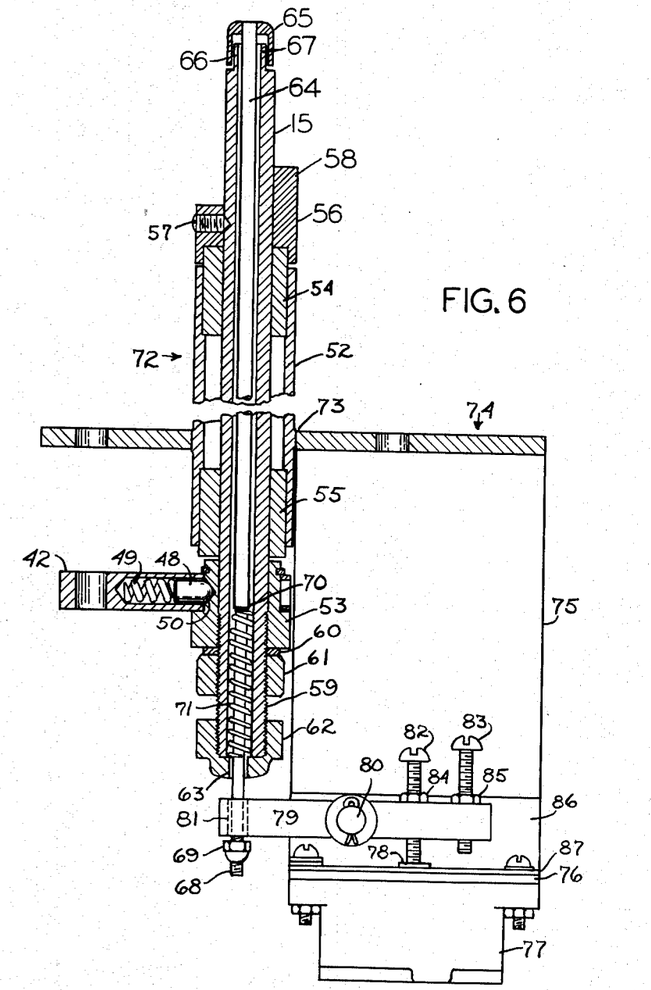
Figure 6 is a view of my agitator drive shaft, bracket, and switch assembly taken substantially on line 6—6 of Figure 9.
Figure 9:
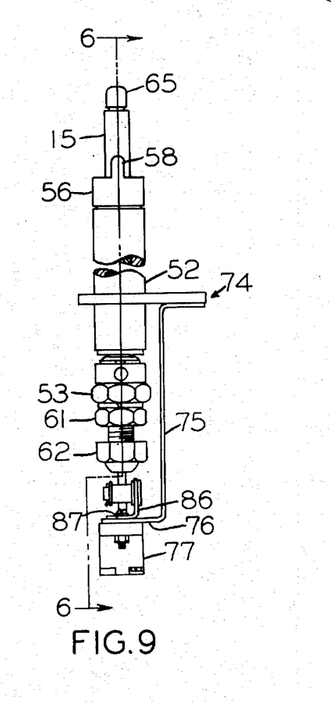
Figure 9 is an elevation of my agitator drive shaft bracket and switch assembly, the switch operating and stop screws being omitted for the sake of clarity.

As shown in detail in Figs. 6 and 9, crank 42 is journaled on a threaded collar 53 which drives agitator shaft 15 through a safety clutch arrangement including pin 48, the rounded end of which is urged by spring 49 into a recess 50 in collar 53 secured to the lower end of shaft 15. The size of the pin, the radius of the rounded end thereof, the strength of the spring, and the depth of the recess are such that this connection may transmit sufficient power to operate agitator shaft 15 when a normal load is imposed on the agitator 51, as during normal operation. If for any reason agitator 51 is restrained from movement, as by the formation of ice in the container or during removal of the agitator, pin 48 will ride out of recess 50, thus preventing damage to the restrained agitator, to the driving motor 13, or to any of the intermediate connecting elements. A similar safety clutch arrangement is disclosed and claimed in my copending application for Liquid Measuring and Dispensing Device, Serial No. 24,963, filed May 4, 1948, now U. S. Patent No. 2,570,681, granted October 9, 1951.

The agitator drive shaft 15 is ordinarily made tubular and is journaled in a vertical support or post 52 mounted on the base, centrally of trough 21a and between the outer shell 24 and the beverage container 25. Bearings 54 and 55, preferably of the porous oil retaining type, are provided for shaft 15 within post 52. An agitator drive hub 56 is secured to shaft 15 adjacent the upper end of bearing 54 by means of a setscrew 57 and is provided with an upwardly extending key 58. The lower end of drive shaft 15 is threaded at 59 to receive threaded drive collar 53 which is held thereon by lock washer 60 and lock nut 61. Nut 62, threaded on the extreme lower end of the shaft 15, is provided with an opening 63 larger than the diameter of and through which one end of a switch rod 64 extends. Rod 64 also extends axially through the drive shaft. Cap 65 secured to the upper end of rod 64 is provided with a downwardly extending skirt 66 which surrounds a reduced portion 67 of the upper end of drive shaft 15. This arrangement provides a seal for preventing the entry of water or other foreign substances to the interior of drive shaft 15. The lower end of rod 64 is threaded at 68 to receive a nut 69, which may be of the self locking type. Spring 71, which surrounds the lower end of rod 64 and bears against a shoulder 70 formed thereon, rests upon nut 62, thereby urging the rod assembly upwardly. The strength of this spring is such that it will be compressed by the weight of the agitator 51 on cap 65 yet it is made strong enough to compress the switch spring and overcome friction.

Figure 10:
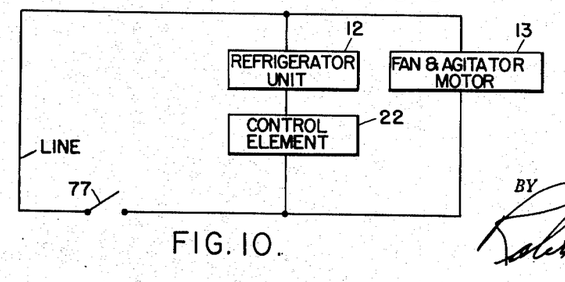
Figure 10 is a schematic wiring diagram of my device.

The entire agitator drive shaft assembly 72 extends through an opening 73 in a support bracket 74 and is secured thereto, as by welding or soldering. The bracket 74 has a downwardly extending portion 75 secured thereto and a horizontally extending portion 76. This latter horizontal portion supports a switch 77 which is normally closed but may be opened by pressure on its operating button 78. Button 78 is spring urged to a protruding position by a spring (not shown) built into the switch and not constituting a part of this invention. I prefer to employ this switch 77 as a line switch, in which event it is connected in series with the line and all electrical elements in my dispenser, as shown in Figure 10. A switch operating lever 79 is pivoted at 80 to an angular bracket having a vertical portion 86 and a horizontal portion 87 and is provided with an opening 81 adjacent one end, through which the lower end of rod 64 extends. The diameter of opening 81, like the opening 63 in nut 62, is larger than the diameter of the lower end of rod 64 so that it does not contact these openings when the machinery is running and wear at these points is consequently avoided. Two screws 82 and 83 extend through threaded openings adjacent the other end of lever 79 and are provided with lock nuts 84 and 85 for locking them in adjusted position. Switch operating screw 82 is located directly above and operates switch button 78, whereas stop screw 83 constitutes an adjustable stop for limiting the clockwise rotation of lever 79 about its pivot.

In Figure 6 line switch 77 is shown in its closed position, rod 64 being shown in its lower or depressed position. This is the position it assumes when the agitator 51 is in place to depress rod 64 against the tension of spring 71 through contact with cap 65. When the agitator is removed or when it is lifted or pushed up for any reason so that its weight no longer holds rod 64 in its lower position, spring 71 will consequently urge rod 64 to an upper position in which lever 79, through contact with nut 69, will be rocked clockwise about pivot 80 until the lower end of screw 83 contacts the horizontal portion 87 of the angular bracket. In this position setscrew 82 will have depressed switch button 78, against the tension of its built-in spring, sufficiently to open line switch 77, thus interrupting the flow of current to all electrical devices connected in series therewith.

Nut 69 on the lower end of rod 64 is adjusted to clear lever 79 when rod 64 is in its depressed position, thereby eliminating frictional contact and wear between the nut and lever during normal operation of the dispenser. This nut may be of a self locking type so that it will remain in the position to which it is adjusted. Screw 82 is adjusted to a position where it will depress push button 78 sufficiently to operate switch 77 when rod 64 moves to its elevated position and lever 79 is rocked clockwise about pivot 80 by nut 69. Set screw 83 is adjusted to prevent clockwise rotation of lever 79 substantially beyond a position necessary for the operation of switch 77. When all the foregoing adjustments are properly made, the lower end of rod 64 and nut 69 will clear lever 79 and will not contact any part thereof during normal operation of the machine with the agitator in position.

Figure 8:
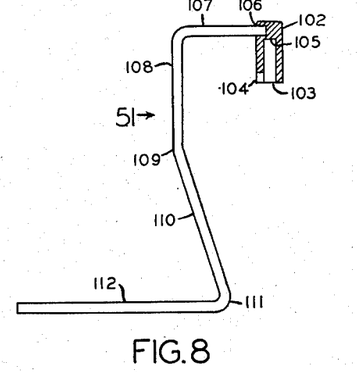
Figure 8 is a side view of my agitator with its hub shown in section.

As shown in Figure 8, my agitator 51 is substantially Z-shaped and is provided with a hub 102 having a cylindrical bore 103, to receive drive shaft 15, and a keyway 104. The keyway 104 receives the key 58 to insure a positive but readily separable driving connection between the hub and the drive shaft 15. The inner end of the bore 105 holds cap 65 down against the tension of spring 71 when the agitator is assembled on the drive shaft. The agitator is soldered or otherwise secured to the hub at 106.

In order to obtain thorough but gentle agitation of the beverage I prefer to make my agitator substantially Z-shaped with an upper horizontal leg or portion 107 extending inwardly over and closely adjacent the top of container 25, as shown in Figure 2, and a vertically downwardly extending portion 108. At a point 109 the agitator is bent toward its axis to form outwardly and downwardly sloped portion 110 which is again bent at 111 to form the lower leg 112 of the Z extending horizontally away from the axis of the drive shaft.

The over-all dimensions of the agitator are such that its upper horizontal leg 107 just clears the upper edge of beverage container 25 and is of such length that the vertical portion 108 is approximately half way between the vertical axis of the beverage container and the wall thereof. The over-all height of the agitator is such that the lower horizontal leg 112 just clears the container bottom and is preferably of a length equal to about three-fourths the diameter of the beverage container.

Upon oscillation of my agitator about its drive shaft the lower horizontal leg 112 will sweep a substantial area of the container bottom and will afford adequate agitation of the beverage adjacent the container bottom. Portion 108 of the agitator is further removed from the drive shaft axis than the point of bend 111 and will consequently swing through a greater arc than point 111 and will thus provide adequate agitation in the upper portion of the container. Inasmuch as portion 110 is sloped, any point thereon will swing through a greater or lesser arc than any other point, the greatest arc being traversed by point 109 and the smallest by point 111. My agitator thus provides a decreasing degree of surface agitation as the beverage is dispensed and the level thereof falls below point 109, thus reducing splash and undesirable aeration of the beverage.

As mentioned heretofore, motor 13 drives a fan 14, located adjacent one end of an air duct or tunnel 113. Vent openings 114 are provided in casing 36 to admit air to the tunnel. The air is then forced by fan 14 through condenser 16 and out to the atmosphere through vent openings 115 in the opposite side of base casing 36. This arrangement air-cools condenser 16 and provides ventilation for the mechanism in the base assembly.

Cold plate 21 is supported on one or more annular rings 116 below which a disk 117 is secured. This arrangement provides a space 118 below the cold plate which is filled with a suitable insulating material such as Santocel. This assembly forms a heat insulating bulkhead between the mechanism in the base and the cold plate. An opening 119 is provided in the disc to provide a passage therethrough for the capillary tube 94 and the inlet and outlet tubing for coil 19, all of which connect to their respective associated elements within the base. The bulkhead assembly is supported on base 120 by means of a plurality of posts 121 spaced about the circumference thereof. Disk 117 also serves as a support for bracket 74, which is bolted thereto, and for motor 13, which is supported thereon by suitable mounts 122. I prefer to use rubber mounts in shear in order to absorb motor vibration.

In servicing the machine, the door 27 may be opened and the beverage poured therethrough into the container 25. If desired, the outer shell 24 may be lifted off, thereby exposing the container 25 for filling. In order to remove the beverage container, the outer shell 24 is first lifted off the base 10, the agitator 51 is then lifted off the drive shaft 15 and drive hub 56, whereupon line switch 77 will open, disconnecting the electrical elements from the power line. The beverage container may then be lifted off for emptying or cleaning. The beverage container cannot be removed from the dispenser without removing the agitator and consequently shutting off the motors driving the mechanisms. The refrigerating unit therefore ceases to operate while the beverage container is removed and the build-up of an undesirable frost layer on the cold plate, while the container is removed, is avoided.

It sometimes happens that in servicing a machine of this kind the operator will remove the container for cleaning and then, for one reason or another, not return the container to the cold plate for a relatively long period of time. If a manually operated switch were relied upon and the operator failed to turn the machine off when he removed the container, a layer of frost would build up rather rapidly on the cold plate. This frost, unless removed, would form an insulating barrier between the bottom of the beverage container and the cold plate when it was finally replaced. When the frost melted an undesirable accumulation of moisture would result. This frost build-up might in some instances be sufficient to space the beverage container from the cold plate to such an extent that the agitator would not clear the bottom of the container and could not operate.

If for any reason, such as failure of the thermostat to operate, ice should form on the bottom of the beverage container, the lower leg of the agitator will contact the ice and, inasmuch as this leg is orbiculate in cross section, its motion with respect to the ice will cause the agitator to cam itself upwardly, whereupon line switch 77 will open to disconnect all motors from the line. Should the agitator fail to cam upwardly, or should it be prevented from oscillating for any reason, damage to it, to the container, or to any of the driving mechanism is prevented by the slipping of the driving conection between crank 42 and collar 53 occasioned by pin 48 riding out of recess 50.

While I have described certain features of my invention more or less specifically it will be evident to those skilled in the art that various changes and modifications may be resorted to within the scope of the appended claims without departing from the spirit or scope thereof.

I claim:

1. Agitator drive mechanism for a beverage dispenser including an agitator support, a drive shaft journalled in said support and adapted to receive an agitator on its upper end, an electric motor for oscillating said drive shaft, a vertical rod extending through said drive shaft, a switch operable by said rod for controlling said motor, means for urging said rod upwardly to open said switch, and means associated with said agitator for preventing upward movement of the rod when the agitator is in its normal position, said switch closing the circuit to said motor when the agitator is in said normal position and opening said motor circuit when the agitator is out of said normal position.

2. A beverage dispenser including an agitator, a refrigerating system, electrically operated mechanisms for driving said agitator and said refrigerating system, and a line switch operable when said agitator is in normal position to close the power circuit to said electrically operated mechanisms and operable when said agitator is moved to an abnormal position to open the circuit and interrupt the power supply to said electrically operated mechanisms, said agitator being substantially Z-shaped and having a substantially horizontal lower leg closely adjacent the bottom of a beverage container for oscillation in a plane parallel thereto, said lower leg of said agitator being orbiculate in cross section so that in the event ice is formed in the bottom of the container the agitator may cam itself upwardly through contact therewith, whereupon the line switch may operate to interrupt the power supply.

3. In a beverage dispenser having a beverage container, a substantially Z-shaped agitator, the lower leg of said Z being positioned closely adjacent the bottom of the beverage container for oscillation in a plane substantially parallel to the bottom thereof, the upper leg of said agitator being substantially shorter than said lower leg, said upper leg having its free end pivoted about a perpendicular axis substantially outwardly offset from the lower angle of the Z, said lower leg being orbiculate in cross section so that it will cam itself upwardly through contact with any ice that may form on the container bottom, drive means for the agitator including a motor, a switch for said motor associated with the agitator and operable on upward movement of the latter to operate the switch and disconnect the motor thereby disabling said agitator drive means.

4. A beverage dispenser having a base, a beverage container supported on said base, an outer shell of greater height than said container supported on said base spaced from and surrounding the container, a cover resting on said outer shell, an agitator support extending upwardly from said base between said container and said outer shell, an agitator drive shaft journaled in said support for oscillating an agitator mounted on the upper end thereof, an electric switch for controlling an agitator drive motor held in closed position by the agitator in its normal operating position, said agitator extending over the upper edge of and depending into said container and having a lower leg adjacent the container bottom whereby an appreciable ice formation on the bottom will cam the agitator to an abnormal position and the switch to open position to render said drive motor inoperative.

5. A beverage dispenser having a beverage container and an attenuated agitator, the lower leg of said agitator being positioned closely adjacent the bottom of the beverage container for oscillation in a plane substantially parallel to the bottom thereof, said lower leg being orbiculate in cross section so that it will cam itself upwardly through contact with any ice that may form on the container bottom, drive means for the agitator, an electric motor for operating said drive means, and a switch operated by the agitator and operable on downward movement thereof to energize and on upward movement to deenergize said electric motor.

ROBERT R. HULL.

REFERENCES CITED

The following references are of record in the file of this patent:

UNITED STATES PATENTS

| Number | Name | Date |
|---|---|---|
| 131,660 | Campbell et al. | Sept. 24, 1872 |
| 826,200 | Strowger | July 17, 1906 |
| 1,388,800 | Clark | Aug. 23, 1921 |
| 1,609,915 | Parker | Dec. 7, 1926 |
| 1,740,938 | Altorfer | Dec. 24, 1929 |
| 1,899,459 | Fairgrieve | Feb. 28, 1933 |
| 1,954,073 | Edwards | Apr. 10, 1934 |
| 1,977,548 | Frenning | Oct. 16, 1934 |
| 1,985,064 | Steenstrup | Dec. 18, 1934 |
| 2,074,402 | Killen | Mar. 23, 1937 |
| 2,096,067 | Schaefer | Oct. 19, 1937 |
| 2,263,593 | Richards | Nov. 25, 1941 |
| 2,265,552 | Sticelber | Dec. 9, 1941 |
| 2,287,608 | French | June 23, 1942 |
| 2,492,950 | Amador | Jan. 3, 1950 |
| 2,502,589 | Rabjohn | Apr. 4, 1950 |

FOREIGN PATENTS

| Number | Country | Date |
|---|---|---|
| 135,372 | Great Britain | Nov. 27, 1919 |
| 605,888 | Great Britain | Aug. 3, 1948 |